United States Patent [19]

Ahmed et al.

[11] Patent Number: 5,409,101
[45] Date of Patent: Apr. 25, 1995

[54] VARIABLY-CONTROLLED VIBRATORY CONVEYOR

[75] Inventors: Gulzar Ahmed, Tualatin; Gregory L. Branch, Newberg; James F. Bausch, West Linn; Richard T. Symer, Lake Oswego; Joseph J. Stupak, Jr., Portland, all of Oreg.

[73] Assignee: Allen Fruit Co., Inc., Newberg, Oreg.

[21] Appl. No.: 192,276

[22] Filed: Feb. 3, 1994

[51] Int. Cl.⁶ .............................................. B65G 27/00
[52] U.S. Cl. ................................................... 198/750
[58] Field of Search ............... 198/750, 751, 753, 759, 198/761, 762, 767, 766

[56] References Cited

U.S. PATENT DOCUMENTS

| | | |
|---|---|---|
| 1,672,807 | 6/1928 | Etzel . |
| 2,094,787 | 10/1937 | Flint . |
| 2,259,565 | 10/1941 | Hutcheson . |
| 2,287,223 | 6/1942 | Baird . |
| 2,322,217 | 6/1943 | Baird . |
| 2,444,134 | 6/1948 | Hittson . |
| 2,585,719 | 2/1952 | Alvord . |
| 2,654,466 | 10/1953 | Spurlin . |
| 2,819,788 | 1/1958 | Howard . |
| 2,918,590 | 12/1959 | Gilbert . |
| 2,926,773 | 3/1960 | Alvord . |
| 2,947,410 | 8/1960 | Carrier, Jr. . |
| 3,149,255 | 9/1964 | Trench . |
| 3,322,260 | 5/1967 | Schwenzfeier . |
| 3,336,488 | 8/1967 | Scott . |
| 3,366,809 | 1/1968 | Scott . |
| 3,400,316 | 9/1968 | Kuschel . |
| 3,518,463 | 6/1970 | Abbott . |
| 3,548,225 | 12/1970 | Vit . |
| 3,548,227 | 12/1970 | Woodward . |

(List continued on next page.)

FOREIGN PATENT DOCUMENTS

| | | |
|---|---|---|
| 1103851 | 3/1961 | Germany . |
| 1111720 | 7/1961 | Germany . |
| 776699 | 6/1957 | United Kingdom . |
| 1032637 | 6/1966 | United Kingdom . |

(List continued on next page.)

OTHER PUBLICATIONS

Triplels Dynamics, Inc., "Slipstick, The Won't-Break--the-Product . . . " (undated).
Triplels Dynamics, "Evolution of the Slipstick," (Jan. 1977).
Triplels Dynamics, Inc., "Installation Tips," (May 1992).

(List continued on next page.)

*Primary Examiner*—D. Glenn Dayoan
*Attorney, Agent, or Firm*—Chernoff, Vilhauer, McClung & Stenzel

[57] ABSTRACT

An elongate vibratory conveyor for moving products is reciprocated by driving a motor with a cyclical nonuniform motion by supplying power nonuniformly to the motor. The conveyor is reciprocated in opposite lengthwise directions, without any substantial movement of the conveyor normal to the lengthwise direction. Motor control circuitry variably drives the motor automatically in response to feedback from a sensor which senses a motion related to the conveyor motion. The feedback signal is compared to a selected one of a set of predetermined different motion patterns, and the motor is driven by supplying power nonuniformly thereto in accordance with the selected motion pattern. The conveyor system readily enables instantaneous reversibility of the product flow at the same average velocity, and instantaneous variable control for modifying the motion of the conveyor to obtain either different desired average product velocities or the same average product velocity at different conveyor inclinations or reciprocating frequencies, all irrespective of changes in conveyor loading or resistance to slip of the products conveyed. Separate motors driving either the same conveyor or separate conveyors are driven with cyclical nonuniform motions in synchronization by synchronizing their respective power supplies.

59 Claims, 11 Drawing Sheets

U.S. PATENT DOCUMENTS

| | | |
|---|---|---|
| 3,731,787 | 5/1973 | Gregor . |
| 3,748,553 | 7/1973 | Reiner . |
| 3,786,912 | 1/1974 | Taylor . |
| 4,053,817 | 10/1977 | Yeasting . |
| 4,168,774 | 9/1979 | Musschoot . |
| 4,229,288 | 10/1980 | Akama . |
| 4,327,827 | 5/1982 | Jedo et al. . |
| 4,331,263 | 5/1982 | Brown . |
| 4,350,243 | 9/1982 | Weyandt . |
| 4,354,618 | 10/1982 | Weyandt . |
| 4,369,398 | 1/1983 | Lowry, Sr. . |
| 4,371,800 | 2/1983 | Brander . |
| 4,378,064 | 3/1983 | Brown . |
| 4,401,925 | 8/1983 | Brander . |
| 4,441,060 | 4/1984 | Hamer et al. . |
| 4,490,654 | 12/1984 | Buchas . |
| 4,544,867 | 10/1985 | Jones, Jr. et al. . |
| 4,615,433 | 10/1986 | Ottow . |
| 4,787,502 | 11/1988 | Sullivan et al. . |
| 4,813,532 | 3/1989 | Harper . |
| 4,836,385 | 6/1989 | Slesarenko et al. . |
| 4,909,379 | 3/1990 | Albeck et al. . |
| 4,921,090 | 5/1990 | Gegor . |
| 4,961,491 | 10/1990 | Falconer . |
| 5,085,314 | 2/1992 | Higson . |
| 5,127,512 | 7/1992 | Frölich et al. . |

FOREIGN PATENT DOCUMENTS

| | | |
|---|---|---|
| 1183023 | 3/1970 | United Kingdom . |
| 763218 | 9/1980 | U.S.S.R. . |
| 8602058 | 4/1986 | WIPO . |

OTHER PUBLICATIONS

Triplels Dynamics, Inc., "Maintenance Tips," (May 1992).

Triplels Dynamics Systems, Inc. "Instruction Manual For Slipstick" (May 1987).

"Industrial Uses of Mechanical Vibrations," pp. 6–7 (undated).

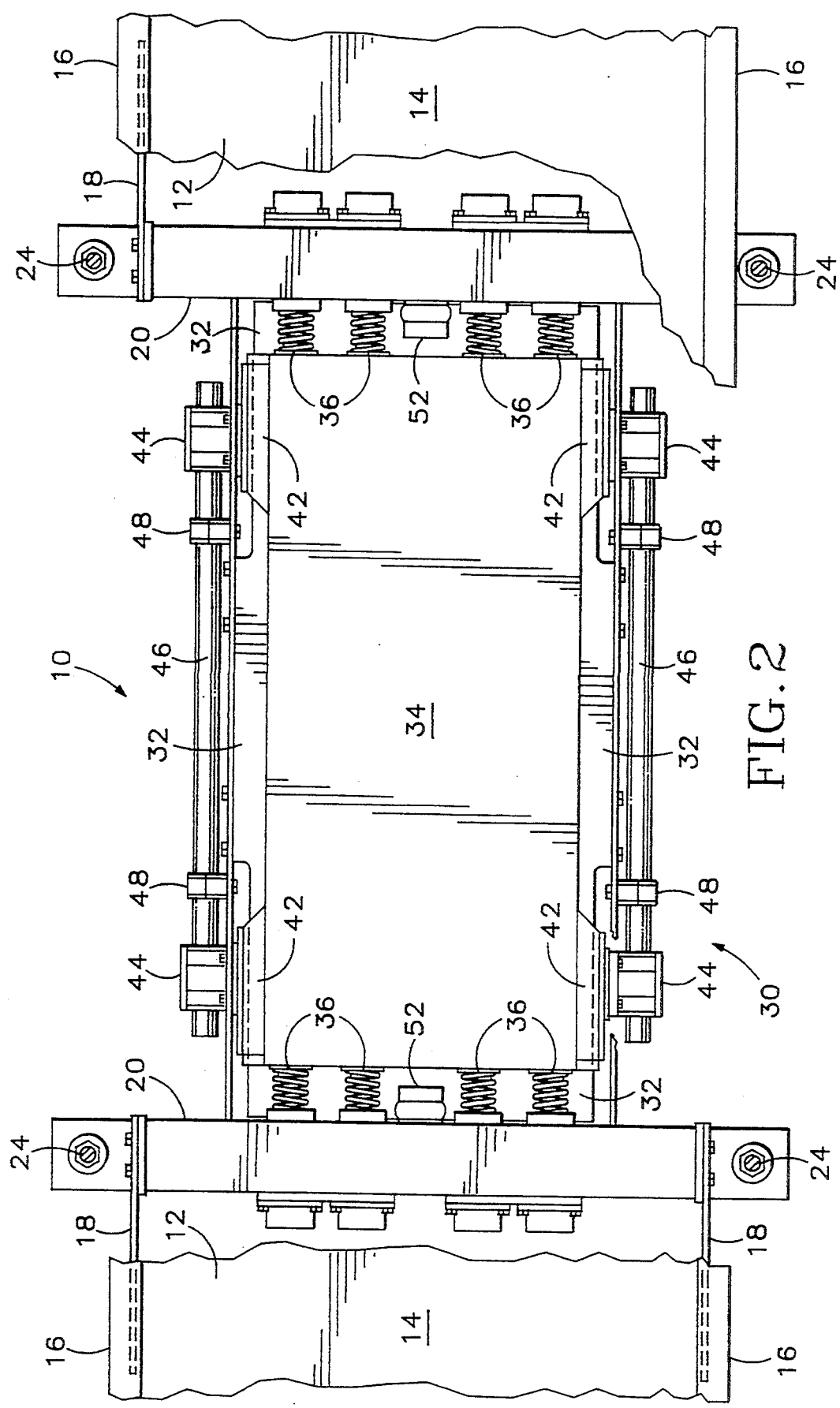

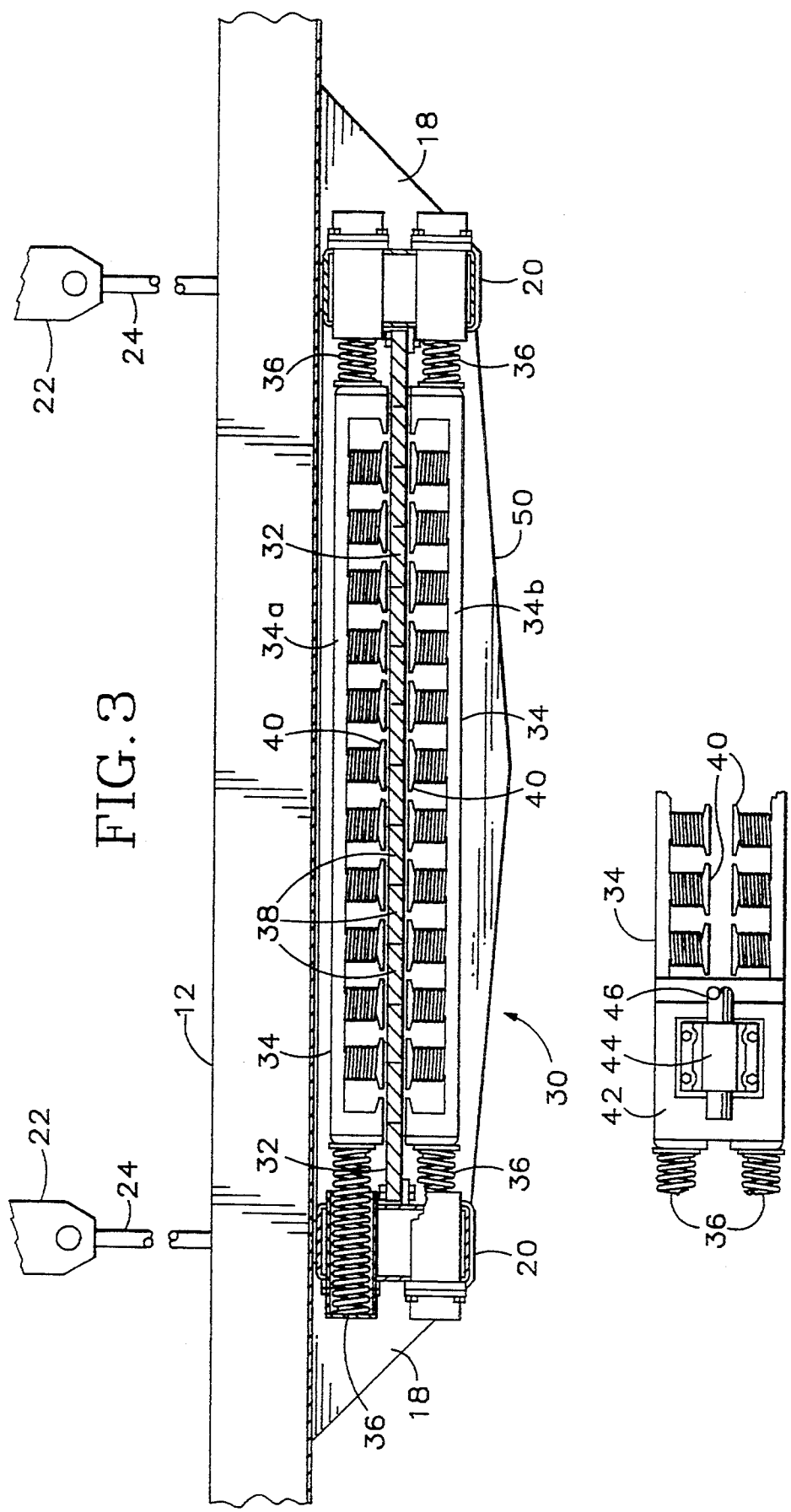

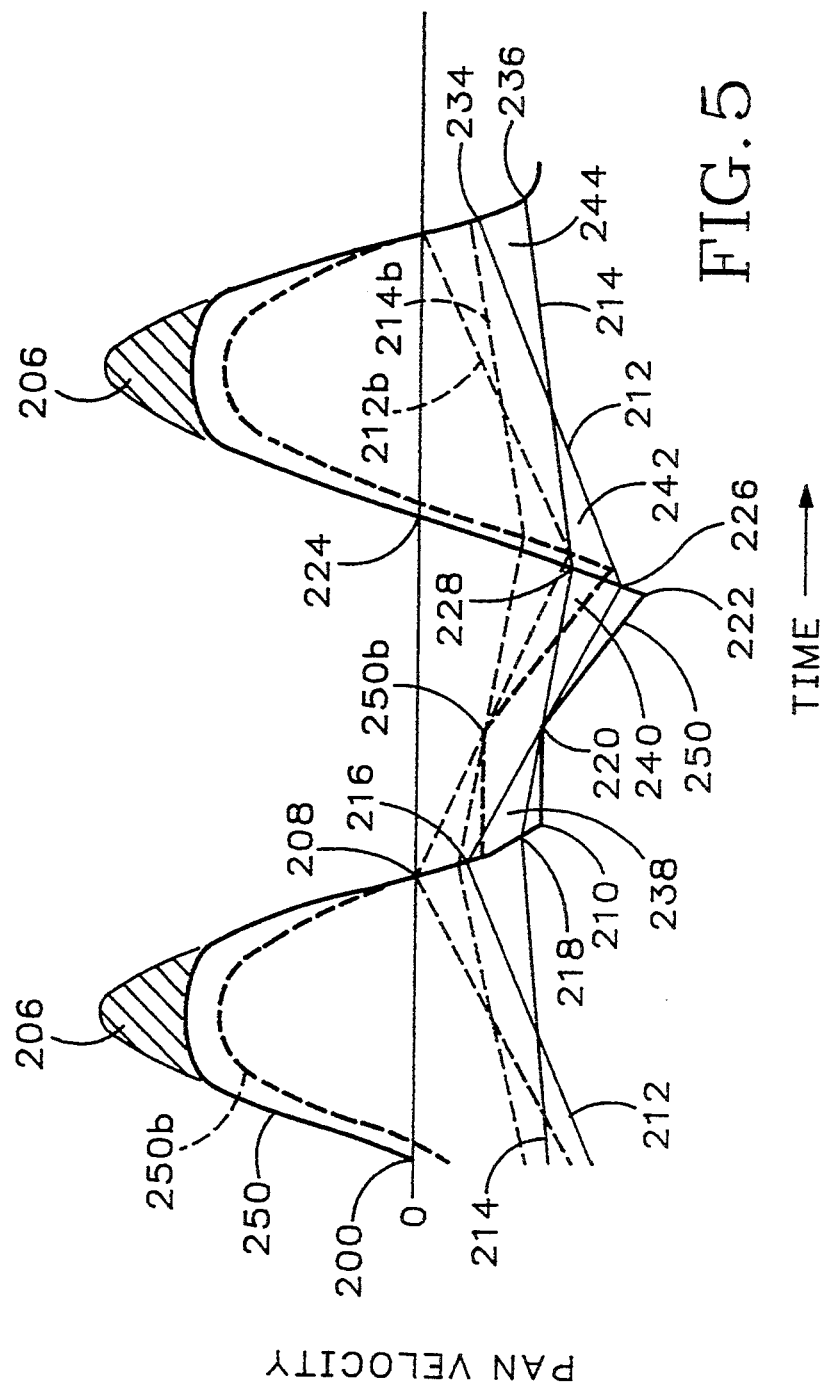

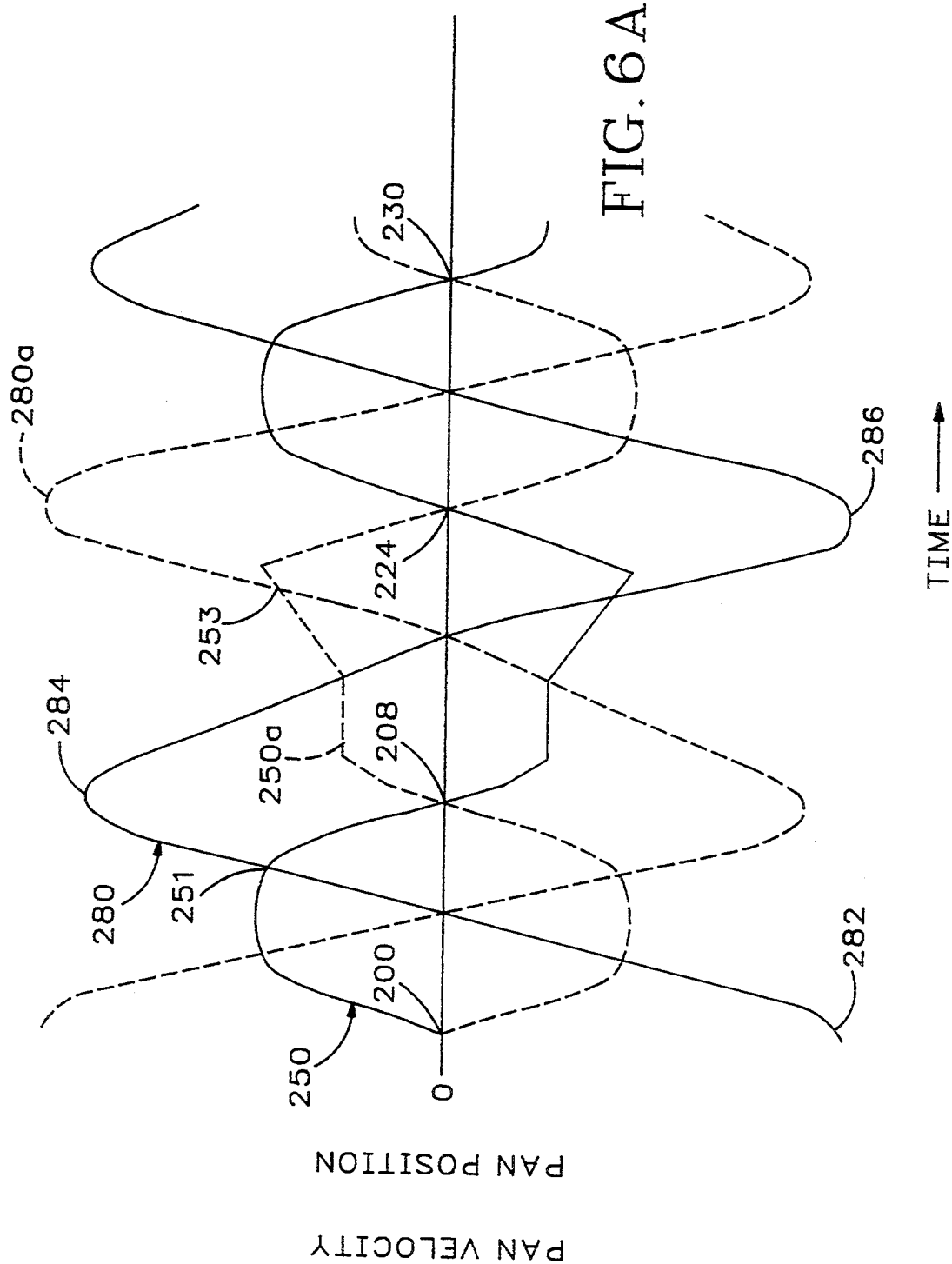

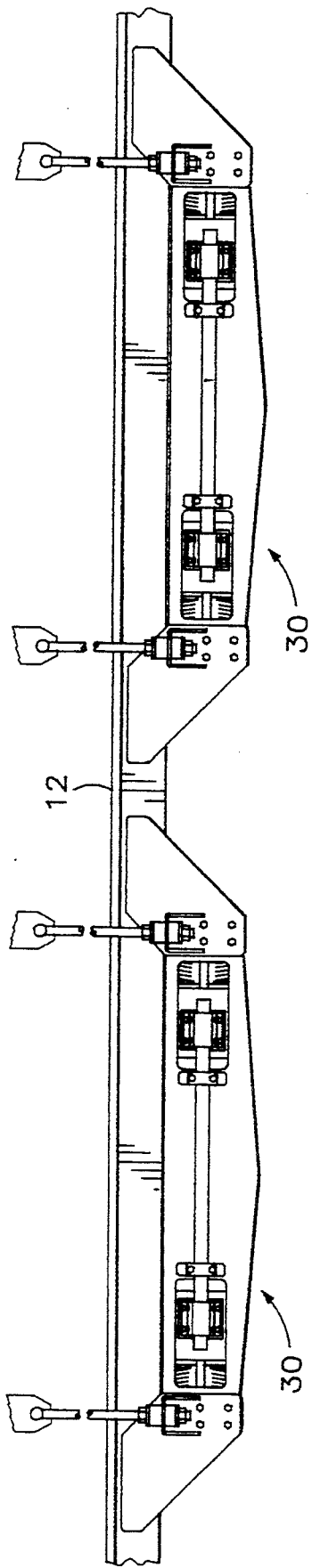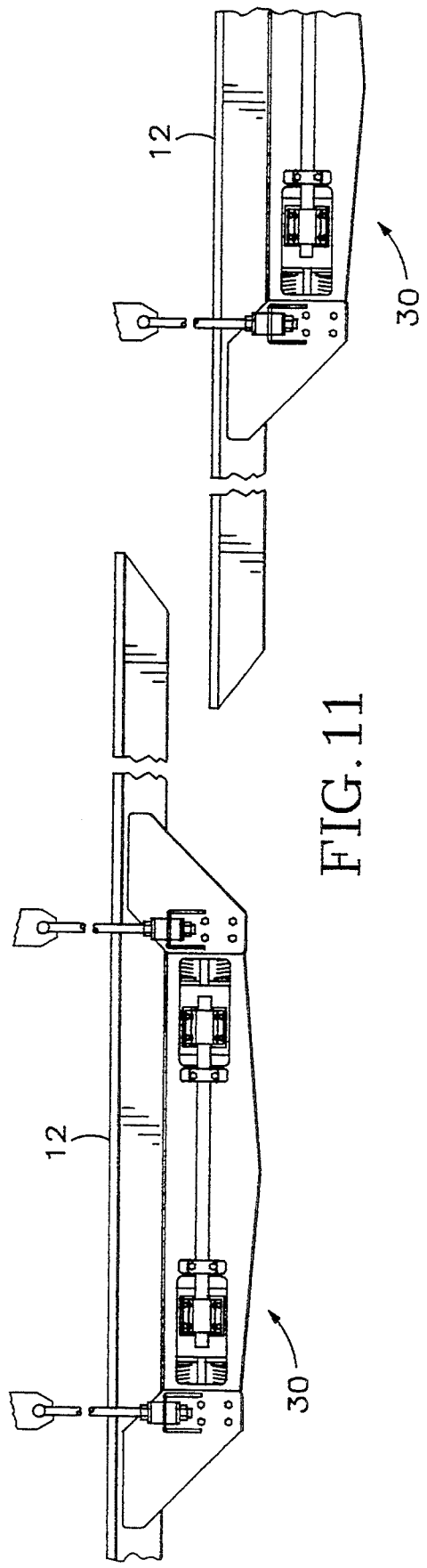

VARIABLY-CONTROLLED VIBRATORY CONVEYOR

BACKGROUND OF THE INVENTION

The present invention relates to a method for reciprocating a vibratory conveyor to transport products, and more particularly to a method for reciprocating the conveyor variably to achieve higher degrees of control and versatility with respect to product movement than have previously been possible.

Vibratory conveyors are used industrially for moving products of different shapes and weights from one location to another. For example, in the packaging of fragile food products such as potato chips or cookies, the food product is received from a central location, such as a cooking oven, and conveyed to a plurality of work stations having packaging machines. The processing of produce, i.e. fruits and vegetables, similarly requires the handling of fragile food products. Vibratory conveyors are especially useful in such applications because such fragile food products may not readily be transported in other ways without damaging the products.

Perhaps the most common vibratory conveyor design features an elongate conveyor pan mounted on a frame by inclined leaf springs or vertical coil springs which cause the pan to reciprocate not only in its lengthwise direction but also normal to its lengthwise direction. Products resting on the pan are thrown upward and forward in the direction of conveyance with each cycle of the drive system, as exemplified by the conveyors shown in U.S. Pat. Nos. 2,094,787, 4,371,800, 4,378,064, and 4,921,090. A significant drawback of this type of vibratory conveyor is damage to the products as they bounce in response to the upward component of the reciprocating pan motion. Also, inherent in this type of conveyor is the inability to provide product flow in opposite directions along the conveyor, because the conveyor pan is mounted to throw products forward in only one direction. Moreover, changing the average velocity of product flow requires a change in reciprocating frequency which may place the frequency undesirably close to the resonant frequency of the conveyor support structure and/or building housing the conveyor. Further, products having different frictional resistances to slip relative to the conveyor pan, due to differences in product batches, temperatures, produce skin conditions or other variables, travel along the conveyor at significantly different average velocities. The inability of the conveyor to compensate for these differences to maintain a substantially constant average product velocity complicates the processing of products at work stations by uncontrollably allowing variations in volumetric flow.

Other previous vibratory conveyor systems have substantially horizontal vibratory motions for moving products along the conveyor, such as the conveyor system manufactured under the trademark SlipStick by Triple/S Dynamics, Inc. of Dallas, Tex. The SlipStick conveyor pan is suspended from pendulum-type hangers which permit it to reciprocate only substantially horizontally, with no significant component of reciprocation normal to the horizontal direction. The conveyor is driven by a uniform-speed motor connected to a mechanical gearing and eccentric weight system that provides a conveyor reciprocating motion pattern having unsymmetrical rates of motion in its opposite directions. The forward motion of the conveyor generally has lesser acceleration and velocity than does the rearward motion, causing the products to move with less slippage relative to the conveyor when the conveyor is moving forwardly than when it is moving rearwardly. This type of motion can automatically compensate for differences in resistance to slip to maintain a constant average product velocity, but only for a single average velocity and conveyor loading. If it is desired to change these parameters while maintaining such compensation for differences in resistance to slip, reconfiguration of the mechanical gearing and weight system is required. Merely changing the average velocity of product flow, without maintaining such compensation for differences in resistance to slip, can be accomplished without mechanical reconfiguration by raising or lowering the uniform speed of the motor, but such changed product velocities are relatively unstable, particularly for larger magnitudes of change, and require a change in reciprocating frequency which may place the frequency undesirably close to the resonant frequency of the conveyor support structure and/or building housing the conveyor. Products can also be moved at the same average velocity in the reverse direction with such a system by reversing the motor, but the direction cannot be changed without stopping the motor and restarting the reciprocating motion in the opposite direction which consumes considerable time.

Many previous vibratory conveyors have no sensor feedback system for automatically variably controlling power to the drive motor to maintain any particular conveyor motion pattern independently of variables such as conveyor loading. For example, the aforementioned SlipStick conveyor, although having a sensor for detecting both excessive and insufficient amplitudes of conveyor reciprocation, merely automatically turns the conveyor off if either of these conditions is detected. On the other hand, systems such as those shown in U.S. Pat. Nos. 4,441,060 and 5,127,512 sense conveyor motion and adjust power in response thereto to ensure maintenance of a desired motion pattern. However, such systems do not use feedback to drive a motor with a cyclical nonuniform motion to maintain a precise conveyor motion pattern with unsymmetrical rates of motion in opposite directions. Accordingly, such systems cannot maintain a precise average product velocity despite differences in resistance to slip, nor provide instantaneous conveyor reversibility, nor provide the same precise average product velocity at different conveyor inclinations and reciprocating frequencies.

SUMMARY OF THE INVENTION

The present invention overcomes the aforementioned deficiencies of the prior art by providing a reciprocating conveyor with a variably-driven motor to achieve improved degrees of control and versatility with respect to product movement.

According to one aspect of the invention, an elongate conveyor is reciprocated by driving a motor with a cyclical nonuniform motion by supplying power nonuniformly to the motor. The conveyor is reciprocated in opposite lengthwise directions, without any substantial movement of the conveyor normal to the lengthwise direction, by cyclically driving the motor nonuniformly. Advantages of the cyclical nonuniform driving of the motor include readily enabling the instantaneous reversibility of the product flow without stopping the driving of the motor, and enabling the instantaneous modification of the motion of the conveyor to obtain either different stable average product velocities or the same stable average product velocity at different conveyor inclinations or reciprocating frequencies, all regardless of variations in resistance to slip of the products conveyed.

According to another aspect of the invention, the motor is driven with a cyclical nonuniform motion by supplying power nonuniformly thereto automatically in response to sensing a motion related to the reciprocating motion of the conveyor, so as to maintain a selected cyclical conveyor motion, with respective unsymmetrical rates of motion in opposite directions, independent of variations in conveyor loading. Preferably, a set of predetermined different motion patterns having a predetermined relationship to conveyor motion is provided, and the motor is driven by supplying power nonuniformly to the motor in accordance with any selected one of the motion patterns. With such a system, the desired conveyor motion pattern may be easily selected and maintained to provide a desired average product velocity and direction despite changes in conveyor loading.

In accordance with another aspect of the invention, a conveyor of substantial length can be provided with multiple motors to reciprocate the conveyor, each interacting with the conveyor at different locations, to provide the desired motion pattern. Alternatively, two separate conveyors may be provided, each with its own separate motors. In either case, the motors can be driven in synchronization with cyclical nonuniform motions, with no need for mechanical interconnections between them, by synchronizing their respective nonuniform power supplies.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is a partial top view of the conveyor assembly of FIG. 1 with portions removed to show underlying structure.

FIG. 3 is a partially sectional side view of the conveyor assembly of FIG. 1 showing the conveyor motor.

FIG. 4 is a partial side view of the armature portion of the conveyor motor.

FIG. 5 is an exemplary velocity profile of the conveyor pan of FIG. 1, also showing product velocity profiles for products having different coefficients of friction.

FIG. 6A is an exemplary velocity profile of the conveyor pan of FIG. 1 with pan position superimposed thereon, and showing in dashed lines the symmetrically reversed profile for reversal of product movement.

FIG. 10 is a side view of an alternative embodiment of the vibratory conveyor assembly driven by two separate motors.

FIG. 11 is a side view of two exemplary vibratory conveyor assemblies driven by separate motors.

DETAILED DESCRIPTION OF THE PREFERRED EMBODIMENT

Figure 1:
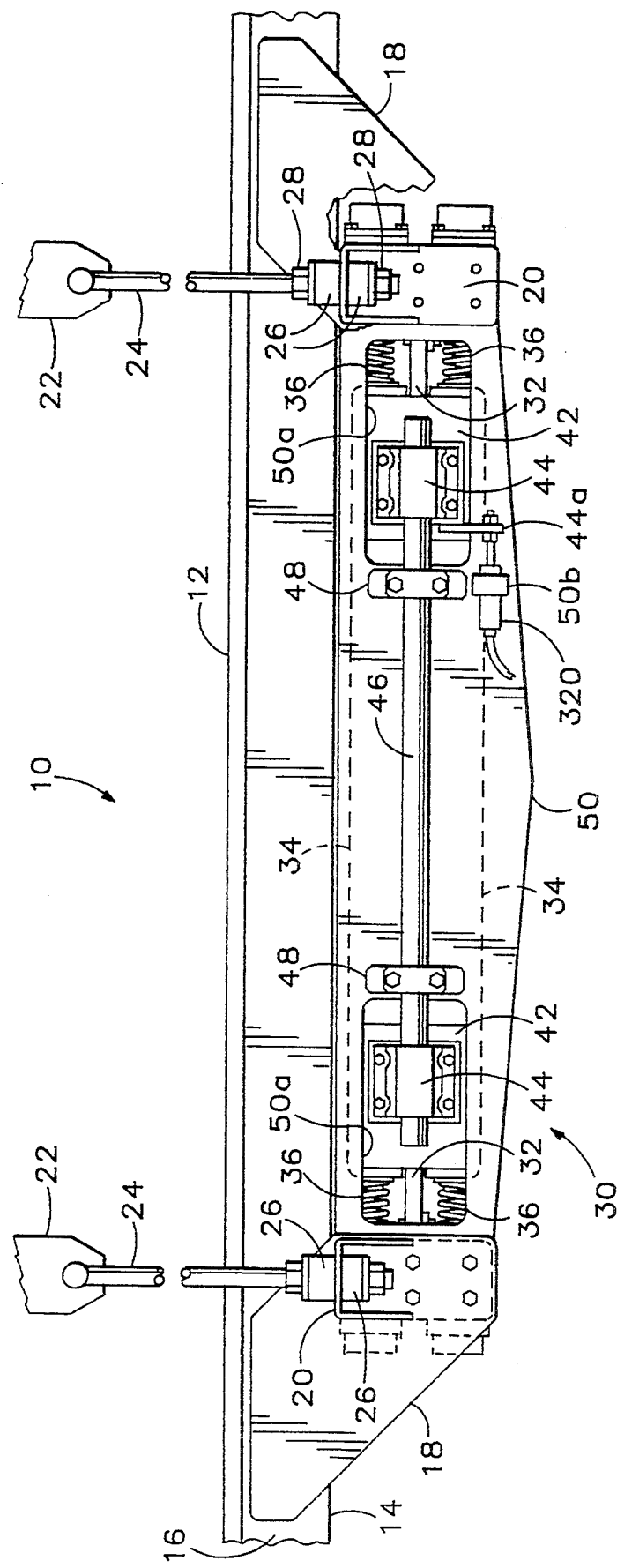
FIG. 1 is a partial side view of an exemplary embodiment of a vibratory conveyor assembly in accordance with the present invention.

An exemplary embodiment of a conveyor assembly, indicated generally as 10, comprises an elongate conveyor in the form of a pan 12 having a planar bottom 14 and upright sides 16 for conveying products lengthwise of the pan 12. Fastened rigidly to the sides 16 of the pan 12 by respective plates 18 are a pair of underhanging cross members 20 suspended from a floor-mounted conveyor frame 22 (FIG. 1) by bars 24. Each of the bars 24 is pivotally suspended from the frame 22 so as to be swingable in pendulum-like reciprocating fashion through a small arc lengthwise of the pan 12. Resilient grommets 26 compressed between nuts 28 connect the bars 24 to the cross members 20 and impede the small reciprocating motion. The bars 24 are approximately 18 inches in length, while the amplitude of reciprocation at the bottoms of the bars is only about one inch. This constrains the pan 12 to reciprocate in opposite lengthwise directions without any substantial movement of the pan normal to such lengthwise directions, any such normal movement being limited to about one percent of the lengthwise amplitude. This is in contrast to the type of vibratory conveyor in which the conveyor pan is mounted on inclined leaf springs or vertical coil springs and thus is intended to have substantial movement normal to the lengthwise direction (usually approximately 15% of the lengthwise amplitude) in order to throw the products upwardly and forwardly in the intended direction of travel.

As an alternative to the suspension bars 24, the pan 12 could be mounted on a series of longitudinally spaced rollers to provide substantially exclusive lengthwise vibratory movement. Moreover, although a conveyor 12 having a planar bottom 14 is depicted, conveyors 12 of other configurations could be used, such as those having arcuate bottoms or even tubular shapes for transporting viscous fluids or slurries at a controlled velocity by vibratory motion.

Mounted below the pan 12 is a motor 30 for reciprocating the conveyor in opposite lengthwise directions. Although the motor 30 may take many different forms, such as electromagnetic, fluid power, linear, rotary, reciprocating, nonreciprocating, etc., the preferred motor 30 is a linear reciprocating electromagnetic motor. A planar stator 32 is rigidly connected between the respective cross members 20, while a flat movable motor element 34 is connected to the cross members 20 by horizontal coil springs 36. Although the motor could be an induction motor, it is preferably of the permanent magnet type with the stator 32 comprising permanent magnet material polarized in transverse strips 38 (FIG. 3) with their north poles facing alternately up and down. Corresponding armature teeth 40 on the movable element 34 are alternately oppositely wound, the center-to-center spacing of the teeth 40 being greater than the intended amplitude of movement of the element 34 relative to the stator 32. Thus, each permanent magnet strip 38 is simultaneously repelled by one armature tooth 40 while it is attracted by the oppositely wound adjacent tooth 40, and vice versa when armature current is reversed.

Although it is within the scope of the invention for the armature 34 to have wound teeth only on one side of the stator 32 or, alternatively, to constitute the permanent magnet portion of the motor while the stator constitutes the armature, the arrangement shown in FIG. 3 is deemed preferable for providing a mass of the movable element 34 most nearly matching the mass of the pan 12. While it is not necessary that these masses be substantially equal, the relative motions of the element 34 and pan 12, respectively, are substantially equal and opposite if the masses are equal. To enable reciprocation of the element 34 and stator 32 relative to each other, the upper and lower portions 34a, 34b of the element 34 are fastened to each other in spaced relationship by respective side members 42. The side members have slide bushings 44 protruding transversely therefrom and slidably mounted on carrier rods 46 affixed by brackets 48 to respective side plates 50 extending between the cross members 20. As shown in FIG. 1, the slide bushings 44 protrude transversely through respective windows 50a, formed in the side plates 50, which are large enough to permit lengthwise reciprocation of the slide bushings relative to the side plates.

The provision of a substantially flat movable element 34 of the motor 30 in close proximity to the bottom of the conveyor pan 12 minimizes the vertical lever arm between the center of gravity of the element 34 and the center of gravity of the pan 12. This in turn minimizes the torque couple imposed by the movable element 34 on the pan 12 which undesirably tends to pivot the pan 12 about a transverse axis. Alternatively, the reciprocating path of the movable element 34 could be inclined relative to the conveyor pan 12 so as to pass substantially through the pan's center of gravity, which would also minimize the undesirable torque couple.

The coil springs 36, through which the movable element 34 is connected to the conveyor pan 12 through the cross members 20, can be biased equally. However, to minimize the power needed to convey products in a particular direction, the springs 36 can alternatively be biased in favor of a higher spring force in the direction of travel of the element 34 which produces the highest acceleration of the pan 12. In the present invention, the highest acceleration of the pan 12 occurs opposite to the direction of product flow to cause greater slippage between the products and the pan. Therefore, the highest spring bias would be in the same direction as product flow since the element 34 moves opposite to the motion of the pan. Resilient bumpers 52 are interposed between the movable element 34 and the conveyor pan 12 to limit their relative motion without damage in the event that electrical power control is lost. The bumpers 52 are not contacted by the movable element 34 during normal operation.

Instead of the horizontal conveyor arrangement shown in the drawings, the conveyor pan 12 can be mounted on an incline so as to convey product either uphill or downhill. In such case, the pan motion is altered by control of the motor 30 as described hereafter to compensate for the inclination.

For especially long or heavily-loaded conveyors, separate motors 30 can be connected to the conveyor pan 12 at different, longitudinally-spaced locations as shown in FIG. 10. Alternatively, separate conveyors which are required to interact with each other can be driven by separate motors 30 as shown in FIG. 11. In either of these cases, the respective motors 30 are driven with identical cyclical nonuniform motions by synchronizing their respective power supplies.

As shown in FIG. 1, a linear position sensor 320 of any suitable conventional type is provided for sensing pan motion and feeding signals representative thereof to the motor control circuitry described hereafter. Preferably the sensor 320 employs a sonic wave guide of the general type shown, for-example, in U.S. Pat. No. 3,898,555 which is incorporated herein by reference. An especially suitable sensor of this type is marketed under the trademark TEMPOSONIC. In FIG. 1 the sensor 320 is mounted between a bracket 44a on a slide bushing 44 and a bracket 50b mounted on a side plate 50. With this mounting, the sensor 320 senses relative motion between the element 34 and the conveyor pan 12 which, although not the same as the motion of the pan 12, has a predetermined relationship thereto (e.g. approximately twice that of the pan 12 if the masses of the element 34 and the pan 12 are approximately equal). Depending on the relative masses of the element 34 and pan 12, the output of the sensor 320 can be scaled by conventional means to represent actual pan motion. Alternatively, the sensor 320 could be mounted directly between the pan 12 and the frame 22 (in which case the sensor's motion would be directly representative of the pan's motion), or between the movable element 34 and the frame 22 (in which case the sensor's motion would represent a reversal of the pan's motion with appropriate scaling depending on the relative masses of the element 34 and pan 12).

FIG. 5 shows an exemplary conveyor pan motion pattern in the form of a velocity profile 250 pursuant to which the horizontal conveyor pan 12 can be driven to move product to the right in FIG. 1. In FIG. 5, positive velocities correspond to leftward motion, while negative velocities correspond to rightward motion. The pan velocity at point 200 is zero, with the conveyor pan 12 at its maximum displacement to the right. Under the driving influence of the motor 30, the velocity of the pan increases to a maximum leftward velocity by variable, nonuniform modulation of the power supplied to the motor 30, as described hereafter. The power to the motor 30 is modulated in such a way that the normal top region 206 above the velocity profile 250 is preferably excluded so as to reduce the power required to drive the conveyor pan 12. However, to compensate for variable shaping of the velocity profile 250 in the negative, or rightward, velocity region as described hereafter, the excluded top region 206 may also be variably shaped such that the overall displacements of the conveyor pan 12 to the right and left, respectively, are equal regardless of variations in the velocity profile 250.

Thereafter, the velocity of the pan decreases to zero at point 208 with the pan at its maximum displacement to the left. The pan 12 then increases its velocity in the negative, or rightward, direction to point 210, after which the velocity is substantially constant to point 220. Then the rightward velocity sequentially increases to point 222 and decreases to point 224 which corresponds substantially to the point 200 of maximum rightward displacement of the pan. As can be seen from an overview of the velocity profile, the leftward stroke of the pan is generally of shorter duration, and greater average velocity and acceleration, than the rightward stroke corresponding to the direction of product movement.

Superimposed on the velocity profile 250 are exemplary product velocity lines 212 and 214 which show the movement of two different illustrative products on the conveyor pan corresponding, respectively, to products with coefficients of friction of 0.3 and 0.1 relative to the pan 12. Points 216 and 218 are the points at which the respective products, which were previously decelerating in the rightward direction of product flow because of the frictional resistance of the leftward-moving pan 12 to their respective momentums, now accelerate in the rightward direction as the pan's rightward velocity exceeds the respective velocities of the respective products. During the period of constant pan velocity between the points 210 and 220 on the velocity profile, slippage between the pan and the products is reduced as the products continue to accelerate to the right. When the pan begins to accelerate to the right at point 220, further rightward acceleration of the products, with increased slippage, takes place until, at points 226 and 228, the decelerating rightward velocity of the pan falls below the rightward velocity of the respective products. At these points 226 and 228, the respective products once more begin to decelerate due to frictional resistance in the rightward direction and continue such deceleration through the leftward stroke of the pan. However, the products do not reverse direction during the leftward stroke because their momentum continues to carry them forward, due to slippage, to points 234 and 236 which correspond to previous points 216 and 218, respectively. Rightward product movement continues cyclically in this manner so long as the motor 30 continues to drive the conveyor pan 12 to produce the velocity profile 250.

By driving the motor 30 with a cyclical nonuniform motion by supplying power nonuniformly thereto, the conveyor pan 12 is likewise driven with unsymmetrical rates of motion in its opposite directions as exemplified by the velocity profile 250. In general, the longer duration and lesser average accelerations and velocities which characterize the stroke of the conveyor pan in the direction of product movement (rightward in FIG. 5) cause the products to move with less slippage than when the pan moves in the opposite direction, where the stroke duration is shorter and the average accelerations and velocities of the pan are generally greater. This unsymmetrical pan motion moves the products in the desired direction despite the fact that the pan 20 is maintained substantially horizontal with substantially no vertical component of reciprocation which would tend to throw the products mechanically in the desired direction. One of the advantages of such an unsymmetrical system is that products having relatively larger coefficients of friction relative to the pan 12, as exemplified by the product velocity line 212, accelerate more during the conveyor stroke in the direction of product flow, and decelerate more during the opposite conveyor stroke, than do products having lower coefficients of friction such as that exemplified by the product velocity line 212. With shaping of the conveyor pan velocity profile 250 generally as illustrated by nonuniform power supply to the motor 30, products having different coefficients of friction relative to the pan 12 will nevertheless move at approximately the same average velocity in the direction of product flow using the same velocity profile 250 so that, at the end of a predetermined time period, they have moved substantially the same distance. In FIG. 5, this result is exemplified by the fact that the area under the product velocity line 212 is approximately equal to the area under the product velocity line 214. This results from the sum of the two areas 240 and 242 between the lines 212 and 214 being approximately equal to the sum of the two areas 238 and 244 between the same lines. This equality can be maximized by adjusting the length of the constant pan velocity portion of the velocity profile 250 between the points 210 and 220 thereon.

Although it is common to control the average velocity of product flow by controlling the reciprocating frequency of a vibratory conveyor pan, the present invention enables product velocity to be controlled in a different manner which is more desirable, i.e. by controlling the stroke or amplitude of pan reciprocation independently of the frequency. This is accomplished by regulating the cyclical nonuniform power supply to the motor 30. Generally, average pan velocities in both directions of reciprocation can be increased to increase stroke or amplitude and thereby increase average product flow velocity, without any change in the frequency of reciprocation, by increasing the average electrical power to the motor 30 in both directions of reciprocation, and vice versa to decrease average product flow velocity. In FIG. 5, the pan velocity profile 250b in dashed lines exemplifies a decreased average product flow velocity with a decreased amplitude of pan reciprocation, while exemplary product velocity lines 212b and 214b exemplify the corresponding movements of the two products with coefficients of friction of 0.3 and 0.1, respectively, at the same decreased average product velocity. In all cases, the area under the upper portion of the modified velocity profile 250 must be equal to the area under the lower portion of the modified velocity profile to maintain equal displacement in both directions of conveyor pan reciprocation.

The ability to control average product velocity by controlling the amplitude of pan reciprocation independently of the frequency of reciprocation provides a significant advantage over frequency-dependent product velocity control systems, because vibrational resonances in the conveyor support structure and/or in the building housing the conveyor are always a concern with vibratory conveyors. If average product flow velocity is frequency-dependent, obtaining a desired average product flow velocity may necessitate an undesirable reciprocating frequency close to the resonant frequency of the support structure and/or building, maximizing the transmitted vibration to the support structure or building. While it is possible, with previous vibratory conveyor drives, to change the frequency of reciprocation without changing the average product flow velocity by mechanically reconfiguring the eccentric drive weights or other comparable mechanisms, the mechanical complications and time involved in accomplishing such reconfigurations make it difficult to adjust each individual conveyor for minimum vibration transmission to its particular environment while nevertheless achieving an optimum desired product flow velocity, and especially a choice of such velocities. The present invention, on the other hand, makes practical the on-site adjustment of operating frequency to minimize the transmitted vibration while, independently of such frequency, enabling a selection of different desired product flow velocities. For example, if it becomes necessary to increase the frequency of reciprocation in order to minimize vibration transmission to the conveyor's environment, a set of modified velocity profiles 250 will achieve the same selection of predetermined product velocities, each modified profile producing the desired increased frequency with correspondingly decreased stroke amplitudes, and vice versa if frequency is to be decreased. These modified velocity profiles control the electrical power to the motor in the manner described hereafter to achieve the desired selection of average product flow velocities.

If the pan is inclined to convey products either uphill or downhill, the desired average product velocity can nevertheless be achieved by modifying the velocity profile 250 to provide a relatively greater pan stroke duration with a lesser average velocity in the uphill direction, and vice versa in the downhill direction, without changing the overall reciprocating frequency.

Figure 6:
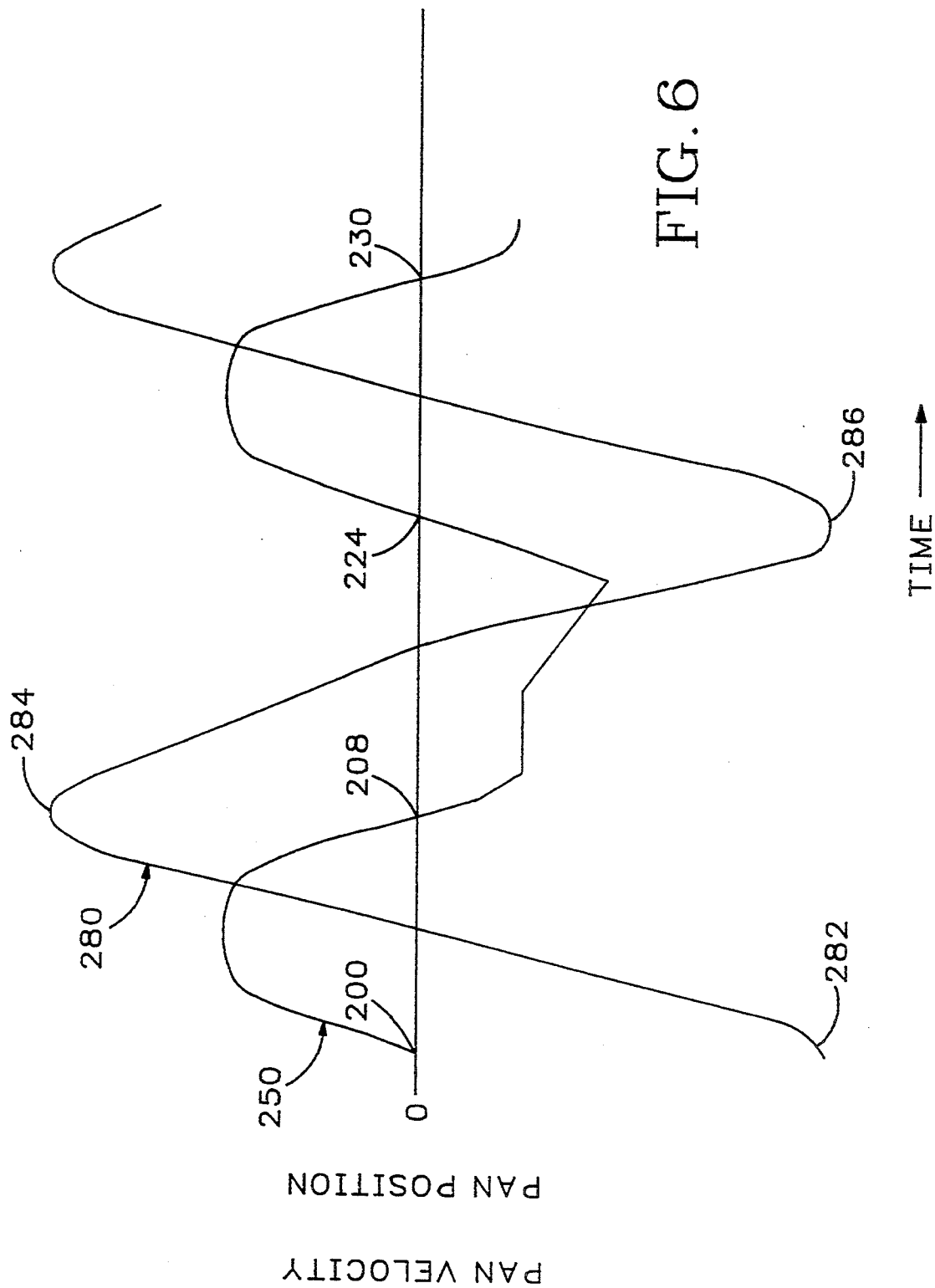
FIG. 6 is an exemplary velocity profile of the conveyor pan of FIG. 1 with pan position superimposed thereon.

FIG. 6 shows the pan velocity profile 250 superimposed with another exemplary conveyor pan motion pattern in the form of a corresponding pan position profile 280. The conveyor assembly, including the conveyor pan 12, motor 30 and coil springs 36, has a resonant frequency at which the required power input to the motor 30 for maintaining reciprocation is minimized. The conveyor pan position profile 280 has generally a sinusoidal shape with a frequency (e.g., about 300 cycles per minute) which is preferably near the resonant frequency of the exemplary conveyor assembly of FIG. 1 for minimizing power consumption (but remote from the resonant frequency of the support structure and/or building). However, the duration of the rightward motion between points 284 and 286 is longer than the duration of the leftward motion between points 282 and 284, consistent with the lower average acceleration and velocity during the rightward motion necessary to move the product to the right. Accordingly, although the system tries to approximate resonant operation within itself to minimize power consumption, it cannot operate resonantly.

FIG. 6A is the same as FIG. 6, except that an exemplary symmetrical reversal of the conveyor pan velocity profile 250 and position profile 280 are superimposed thereon in dashed lines. By supplying power to the motor 30 in accordance with the symmetrically reversed conveyor pan velocity profile 250a, the horizontal pan 12 can move products in a leftward direction at substantially the same average velocity at which it moves products in a rightward direction when operating in accordance with the pan velocity profile 250. In fact, it is possible to reverse the direction of product flow without interrupting the driving of the motor 30 or the reciprocation of the conveyor. This is accomplished by causing reversal to occur at a conveyor position and velocity substantially matching a corresponding position and velocity of the symmetrically-reversed profiles. For example, as shown in FIG. 6A, the pan velocity and position indicated by the point 251 on the profiles 250 and 280 are the same as the velocity and position indicated by the point 253 on the symmetrically-reversed profiles 250a and 280a. Thus, assuming that the conveyor is moving product to the right in accordance with velocity profile 250 when it reaches point 251, a reversal can occur simply by thereafter supplying power to the motor 30 in accordance with the symmetrically-reversed velocity profile 250a beginning with the point 253. The ability to reverse the direction of product flow instantaneously without stopping the motor or the conveyor is a major advantage of the present invention.

Figure 7:
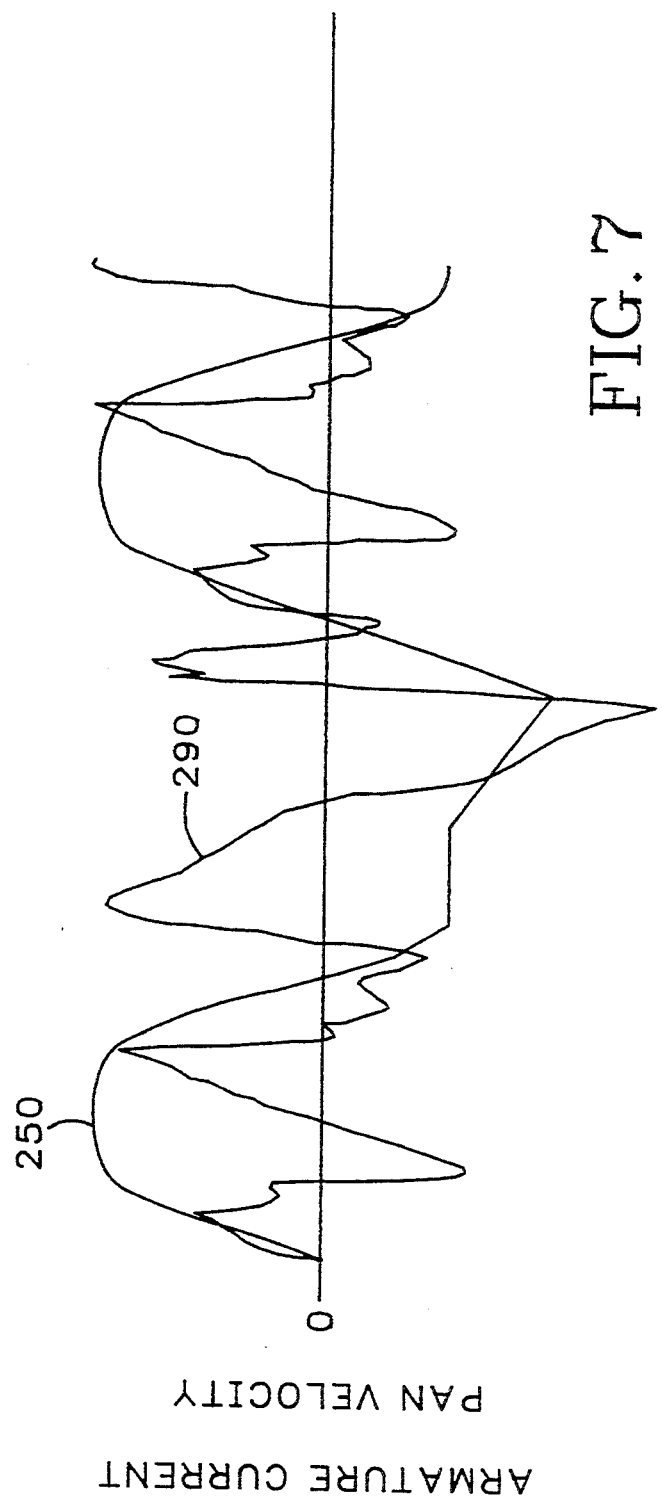
FIG. 7 is an exemplary velocity profile of the conveyor pan of FIG. 1 with armature current superimposed thereon.

Referring to FIG. 7, an exemplary armature current 290 supplied nonuniformly to the motor 30 to produce the velocity profile 250 is shown superimposed thereon.

Figure 8:
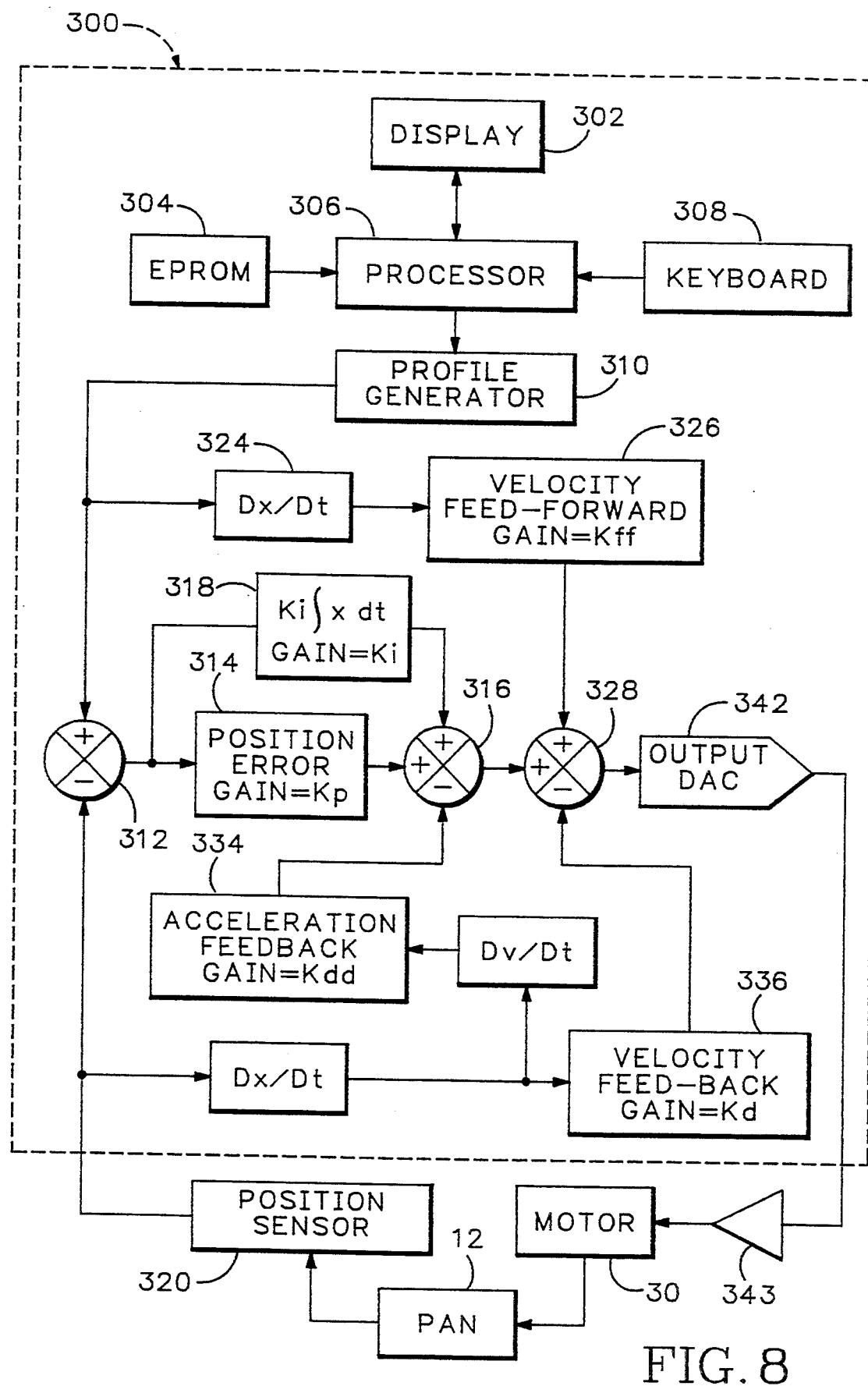
FIG. 8 is a simplified schematic diagram of the motor control circuit for the conveyor of FIG. 1.

To generate the necessary armature current 290 a digital XDC700 servo controller 300, shown in FIG. 8 and produced by MTS Systems Corporation, Machine Controls Division of Eden Prairie, Minn. is preferably employed. The servo controller 300 has a simple one-line display 302 and a keyboard 308 that are both connected to the processor 306. An EPROM (electrically programmable read only memory) 304 is programmed with a custom compiled C code program to control operation of the servo controller 300. The program stored in the EPROM includes different sets of data points, preferably characterized by time, position, velocity and acceleration of the conveyor pan 12, corresponding to different desired conveyor motion patterns. The processor 306 outputs a selected set of data points, corresponding to a desired motion pattern, to the profile generator 310. The profile generator 310 in turn converts the set of data points to a motion pattern in the form of a conveyor pan position profile such as 280 representing the desired position of the conveyor pan 12 over time.

The position sensor 320, previously described with respect to FIG. 1, measures the relative position of the conveyor pan 12 and generates an appropriate signal that can be compared in the summing unit 312 with the output of the profile generator 310. The output of the summing unit 312 is the position error of the conveyor pan 12. To move the conveyor pan 12 in accordance with its desired motion, the servo controller 300 processes the position error signal, and other derivatives of the displacement signals from the position sensor 320 and profile generator 310, to drive an armature current amplifier 343 which variably controls power to the motor 30. The key aspect to control of the conveyor pan motion is its velocity, but to effectuate accurate velocity control the displacement and acceleration are also used.

An amplifier 314 multiplies the position error by a gain factor Kp, while an integrator 318 integrates the position error and multiplies it by a gain factor Ki. (The purpose of the integrator 318 is to provide a nonzero bias output for zero error. In other words, this permits the conveyor to have the coil springs 36 biased in a position that is not zero with respect to the position sensor 320.) These two outputs are fed to the positive inputs of a summing unit 316 where they are combined with a negative input indicative of sensed pan acceleration from a twice-differentiated output of sensor 320 multiplied by a gain factor Kdd in an amplifier 334.

The output of the profile generator 310 is also differentiated by a differentiator 324 to generate a desired velocity feed-forward value which is multiplied by a gain factor Kff in an amplifier 326 and fed to the positive input of a summing unit 328. The position sensor 320 output is similarly differentiated to generate an actual velocity feed-back signal which is multiplied by a gain factor Kd in an amplifier 336 and fed to the negative input of the summing unit 328. Finally, another positive input of the summing unit 328 receives the output of summing unit 316. The output of the summing unit 328 therefore represents weighted values of actual and desired pan displacement and velocity, actual pan acceleration, and a non-zero bias factor. This output is converted by a digital-to-analog converter 342 to control the current to the motor 30 through the amplifier 343.

Exemplary gain values providing a fast response time with minimum overshoot for controlling the conveyor pan 12 are: Kp=5; Ki=100; Kff=210; Kdd=15; Kd=210.

Figure 9A:
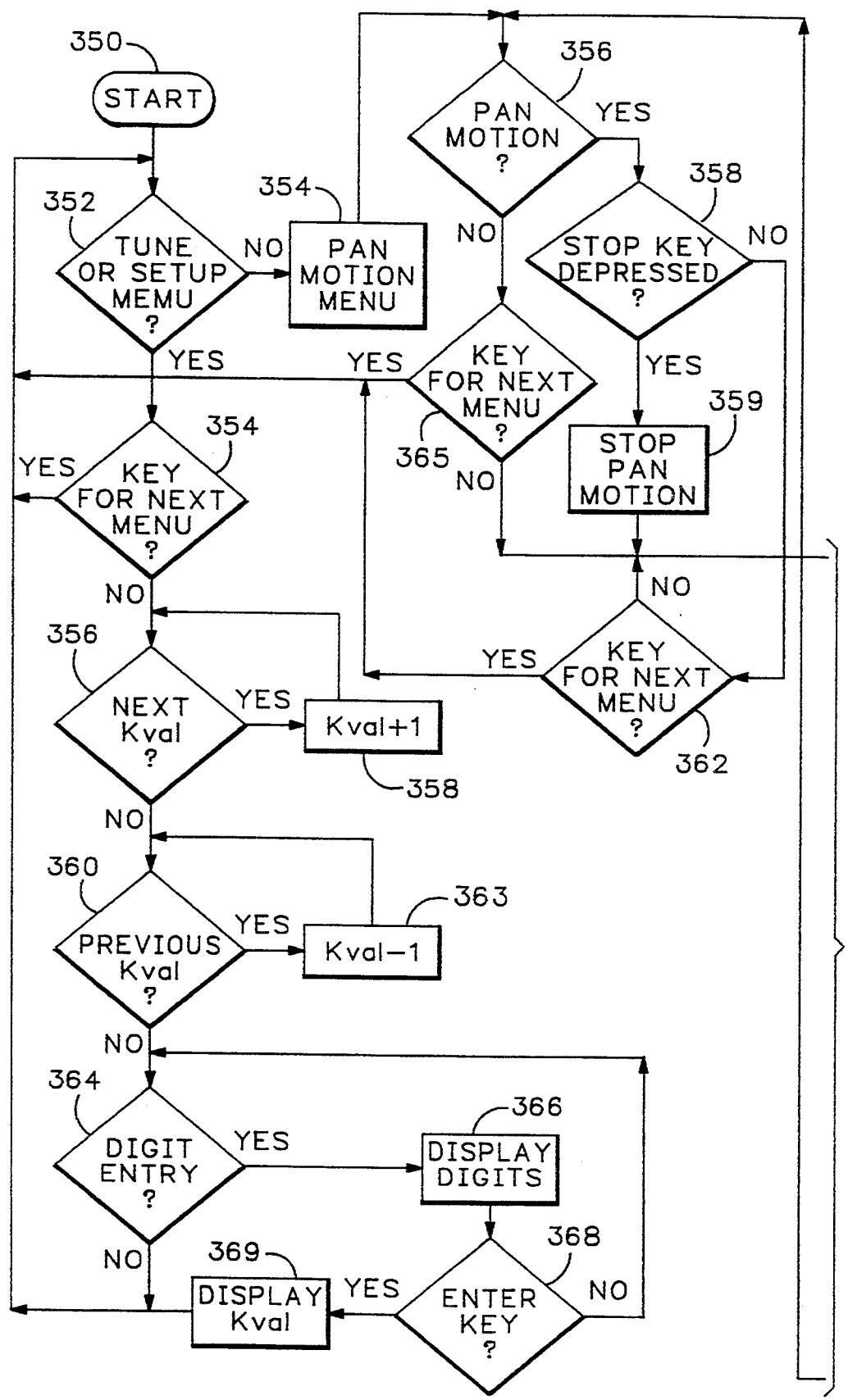
FIGS. 9A and 9B are a simplified logic flow diagram by which the circuitry of FIG. 8 controls the conveyor motor of FIG. 1.
Figure 9B:
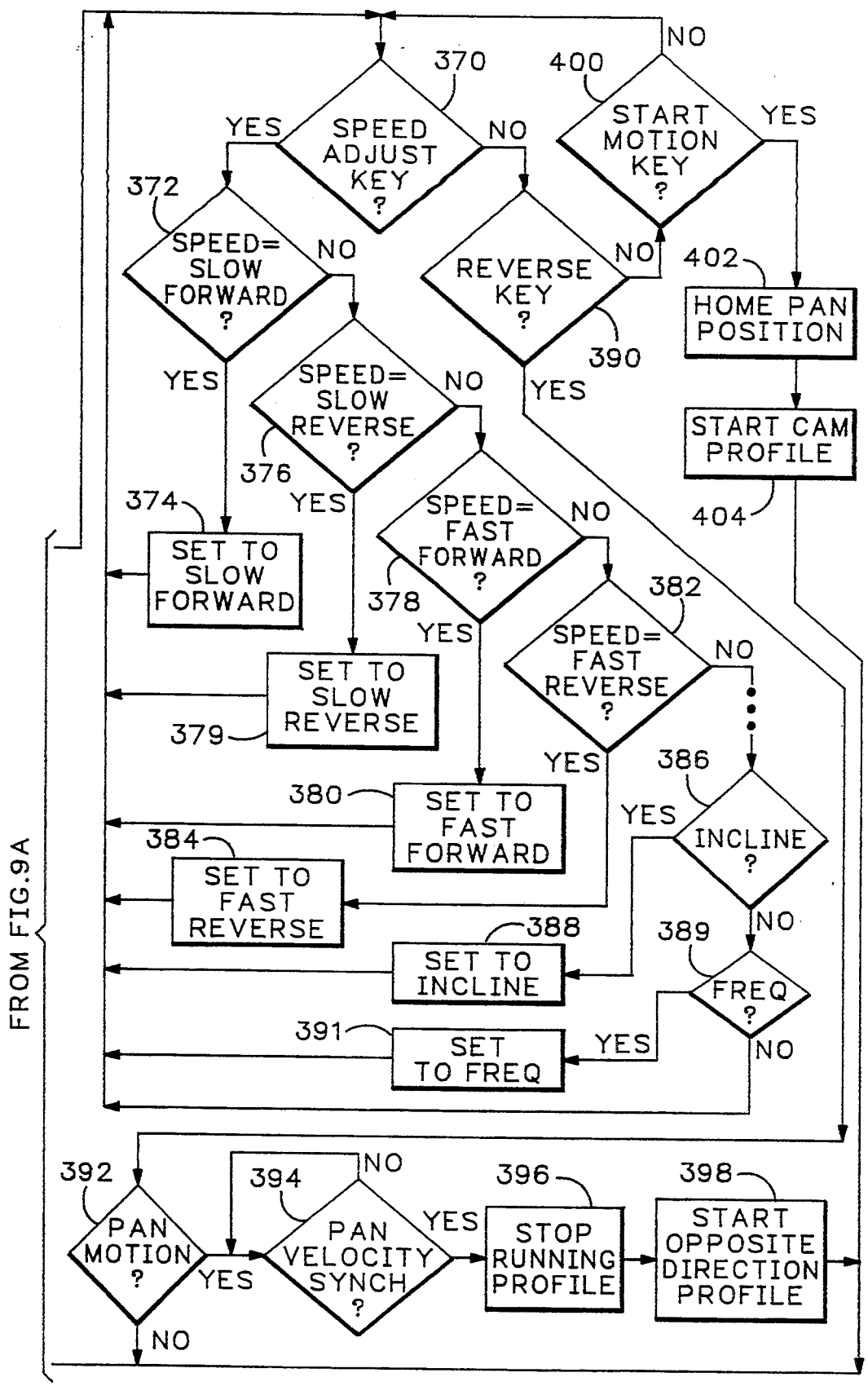

FIGS. 9A and 9B show the flow chart of a program accessible through the display 302 and keyboard 308 for tuning, setting up and controlling the motion of the conveyor pan 12. The program starts at block 350 which passes control to the tune or set-up menu block 352. Block 352 passes control to block 354 if the tune or setup menu is currently selected. Block 354 checks to see if the operator pressed the key for the next menu which scrolls through the available menu choices; and if so, the next menu choice of either tune, setup, or pan motion is selected and displayed in display 302 and control is passed back to block 352. After selecting either the tune or set-up menu choice when the key for the next menu is not depressed, control is passed to block 356 which checks to see if the key for the next gain Kval has been depressed. The next Kval key permits scrolling through each Kval (Kp, Ki, Kdd, Kd, Kff) in a predetermined order, displaying it on the display 302 until the appropriate one is displayed. If the next Kval key is pressed then control is passed to block 358 where the next Kval is selected and displayed on the display 302. If the next Kval key is not pressed then block 360 checks to see if the previous Kval key is pressed and, if so, accordingly passes control to block 363 where the previous Kval is selected and displayed on the display 302.

If neither the next Kval or previous Kval key is depressed then block 364 checks to see if a number key or the enter key has been pressed. If so, then control is passed to block 366 to display the digit including previously entered digits. If a digit is pressed and the enter key was not pressed, then control is passed back to block 364 to check for the entry of another digit or the enter key. The checking for digits and the enter key occurs in a recursive fashion until all the desired digits for the particular Kval are entered. Upon pressing the enter key, block 368 passes control to block 369 which assigns the value of the entered digits to the particular Kval and displays this on the display 302. Control is then passed back to block 352 to check to see if the tune or set-up menu is selected.

The purpose of this routine, which is entered if the tune or set-up menu choice is selected, permits the user during operation of the conveyor pan 12 to tune the Kvals to enhance performance in accordance with servo-control principles which are well known. Prior to conveyor pan 12 operation, the set-up menu may be selected so that new Kvals may be entered. The set-up menu has a lock-out (not shown) that prevents the set-up menu from being selected while the conveyor pan 12 is in motion.

If block 352 determines that the tune or set-up menu is not selected then control is passed to the pan motion menu 354. Block 356 then checks to see if the conveyor pan 12 is in motion. If the conveyor pan 12 is in motion then control is passed to the block 358 which checks to see if the stop key has been pressed. If the stop key has been pressed then control is passed to block 359 which stops the motion of the conveyor pan 12 and in turn passes control to FIG. 9B. If the stop key has not been pressed then control is passed to block 362 which checks to see if the next menu key has been pressed. If the next menu key has been depressed then control is passed back to block 352. If the next menu key has not been pressed, block 362 will then pass control to FIG. 9B.

Alternatively, if the conveyor pan 12 is not in motion, then block 356 passes control to block 365 which checks to see if the next menu key has been depressed. If so, then control is passed back to block 352. If the next menu key has not been depressed then control is passed to FIG. 9B.

Referring to FIG. 9B, control is passed to block 370 which checks to see if the speed adjust key has been pressed. If the speed adjust key has been pressed then the program branches to the selection of an appropriate velocity. Block 372 checks to see if the slow forward key has been depressed and, if so, branches to block 374 selecting the appropriate motion pattern for a velocity profile 250 corresponding to slow forward. If the slow reverse key has been pressed then block 376 passes control to block 379 which selects the motion pattern for a velocity profile 250 for slow reverse. If the fast forward key has been pressed then block 378 passes control to block 380 which selects the motion pattern for a velocity profile 250 for fast forward. If the fast reverse key has been pressed then block 382 passes control to block 384 which selects the motion pattern for a velocity profile 250 for fast forward. If the incline key has been pressed then block 386 enables the operator to select the value for the incline at block 388 and the program will select the motion pattern to accommodate the incline while maintaining the desired product flow velocity. Alternatively, a range of preset inclines may be provided from which to choose. If the frequency key has been pressed, block 389 enables the operator to select the value for the frequency at block 391 which will minimize the transmitted vibration to the support structure and/or building, and the program will select the motion pattern producing both the selected frequency and the selected product flow velocity. The output of blocks 374, 379, 380, 384, 388 and 391 all pass control to block 370 which checks if the speed adjust key has been pressed.

If the speed adjust key has not been pressed then block 370 passes control to block 390 to check if the reverse key has been pressed. If the reverse key has not been pressed then block 390 passes control to block 400 which checks if the start motion key has been pressed. If the start motion key has not been pressed then control is passed to block 370. If the start motion key has been pressed then the conveyor is moved to the home pan position at block 402 so that when a selected motion pattern is started the controller knows the position of the conveyor pan. At block 404 the motion pattern is started and the conveyor pan is brought slowly up to full speed. After obtaining full speed, control is passed to block 356 to check to see if the conveyor pan 12 is in motion.

If the reverse key has been pressed, then control is passed to block 392 which checks to determine if the conveyor pan 12 is currently in motion, which permits the reversal of the product flow on the conveyor pan 12. If the conveyor pan 12 is in motion, control is passed to block 394 which waits until the conveyor pan 12 is at a predetermined synchronization point (such as 251 in FIG. 6A) on the velocity profile 250 where the switch to the reverse profile is possible. At synchronization, block 396 stops the forward motion pattern and block 296 initiates the reverse direction motion pattern (producing a velocity profile such as 250a in FIG. 6A beginning with point 253). Block 398 passes control to block 356 which checks for pan motion.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of reciprocating an elongate conveyor comprising:
   (a) driving a motor with a cyclical nonuniform motion by supplying power nonuniformly thereto; and
   (b) reciprocating said conveyor in opposite lengthwise directions, without any substantial movement of said conveyor normal to said lengthwise directions, by cyclically driving said motor nonuniformly in step (a).

2. The method of claim 1 wherein step (a) includes reciprocating said motor with respective unsymmetrical rates of motion in said opposite lengthwise directions.

3. The method of claim 1 further comprising connecting said motor resiliently to said conveyor.

4. The method of claim 1 wherein step (a) includes selectively reversing the direction of said nonuniform motion of said motor.

5. The method of claim 1 wherein said motor is an electromagnetic motor.

6. A method of reciprocating an elongate conveyor in opposite lengthwise directions comprising:
   (a) sensing a motion having a predetermined relationship to the reciprocating motion of said conveyor;
   (b) driving a motor with a cyclical nonuniform motion by supplying power nonuniformly thereto automatically in response to the motion sensed in step (a); and
   (c) thereby maintaining a predetermined cyclical reciprocating motion of said conveyor with respective unsymmetrical rates of motion in said opposite lengthwise directions.

7. The method of claim 6, including reciprocating said conveyor in said opposite lengthwise directions without any substantial movement of said conveyor normal to said lengthwise directions.

8. The method of claim 6 wherein step (a) comprises sensing a rate of motion having a predetermined relationship to the rate of motion of said conveyor, and step (b) comprises driving said motor variably automatically in response to the rate of motion sensed in step (a).

9. The method of claim 6, further comprising selectively reversing the direction of said predetermined cyclical reciprocating motion of said conveyor.

10. The method of claim 6 wherein said motor is an electromagnetic motor.

11. A method of moving products along an elongate conveyor by reciprocating said conveyor in opposite lengthwise directions comprising:
    (a) providing a set of predetermined different motion patterns having a predetermined relationship to the motion of said conveyor;
    (b) driving a motor selectively with a predetermined cyclical nonuniform motion by supplying power nonuniformly thereto in accordance with a selected one of said motion patterns; and
    (c) thereby reciprocating said conveyor with a selected motion having unsymmetrical rates of motion in said opposite lengthwise directions.

12. The method of claim 11, including reciprocating said conveyor in said opposite lengthwise directions without substantial movement of said conveyor normal to said lengthwise directions.

13. The method of claim 11, further including storing said motion patterns in a memory.

14. The method of claim 11 wherein at least one of said motion patterns comprises a substantial directional reversal of another of said motion patterns.

15. The method of claim 11, further comprising sensing a motion having a predetermined relationship to the motion of said conveyor and driving said motor in step (b) in response to said sensing.

16. The method of claim 11 wherein step (a) includes providing said motion patterns so as to produce different average velocities of said products along said conveyor.

17. The method of claim 11 wherein step (a) includes providing said motion patterns so as to produce the same average velocity of said products along said conveyor despite changes in the attitude of said conveyor with respect to horizontal.

18. The method of claim 11 wherein said motor is an electromagnetic motor.

19. A method of moving products along an elongate conveyor by reciprocating said conveyor in opposite lengthwise directions comprising:
    (a) selectively driving a motor variably, and thereby reciprocating said conveyor so as to move said products along said conveyor selectively in either one of said opposite lengthwise directions; and
    (b) reversing the direction of movement of said products along said conveyor while driving said motor substantially continuously.

20. The method of claim 19, further including reciprocating said conveyor in said opposite lengthwise directions without substantial movement of said conveyor normal to said lengthwise directions.

21. The method of claim 19, further including providing at least one pair of directionally reversed motion patterns having a predetermined relationship to the motion of said conveyor, and driving said motor in step (a) selectively in accordance with a selected one of said motion patterns.

22. The method of claim 21, further including providing different pairs of said directionally reversed motion patterns.

23. The method of claim 19, further comprising sensing a motion having a predetermined relationship to the motion of said conveyor and driving said motor in step (a) in response to said sensing.

24. The method of claim 19 wherein said motor is an electromagnetic motor.

25. A method of moving products along an elongate conveyor by reciprocating said conveyor in opposite lengthwise directions comprising:
    (a) driving a motor with a cyclical nonuniform motion by supplying power nonuniformly thereto, and thereby reciprocating said conveyor with respective unsymmetrical rates of motion in said opposite lengthwise directions; and
    (b) thereby causing different amplitudes of slip between said products and said conveyor in each of said opposite lengthwise directions, so that respective ones of said products move at substantially the same average velocity along said conveyor even though said respective ones of said products have different resistances to slip relative to said conveyor.

26. The method of claim 25, further including reciprocating said conveyor in said opposite lengthwise directions without substantial movement of said conveyor normal to said lengthwise directions.

27. The method of claim 25 wherein step (a) includes driving said motor in accordance with a predetermined motion pattern having a predetermined relationship to the motion of said conveyor.

28. The method of claim 27, further including storing said motion pattern in a memory.

29. The method of claim 27, further including driving said motor in step (a) selectively in accordance with a substantial directional reversal of said motion pattern.

30. The method of claim 25, further comprising sensing a motion having a predetermined relationship to the motion of said conveyor and driving said motor in step (a) in response to said sensing.

31. The method of claim 25 wherein said motor is an electromagnetic motor.

32. A method of reciprocating an elongate conveyor comprising:
(a) orientating a substantially flat movable element of a motor in a location proximate to and beneath said conveyor;
(b) reciprocating said movable element linearly generally lengthwise of said conveyor; and
(c) thereby reciprocating said conveyor in opposite lengthwise directions, with substantially no movement of said conveyor in a direction normal to said lengthwise directions.

33. The method of claim 32, further including reciprocating said movable element linearly in a direction inclined with respect to said opposite lengthwise directions of said conveyor and passing substantially through the center of gravity of said conveyor.

34. The method of claim 32, further comprising connecting said movable element resiliently to said conveyor.

35. The method of claim 34, further comprising inserting opposing springs operatively between said movable element and said conveyor.

36. The method of claim 35, further including biasing said springs nonuniformly.

37. The method of claim 34, further comprising interposing a resilient bumper between said movable element and said conveyor.

38. The method of claim 32 wherein said movable element is an armature of an electromagnetic motor.

39. A method of reciprocating an elongate conveyor in opposite lengthwise directions comprising:
(a) providing at least a pair of motors to reciprocate the conveyor, each interacting with said conveyor at different locations; and
(b) driving said motors with cyclical nonuniform motions by supplying power nonuniformly thereto, and synchronizing the respective nonuniform motions of said motors by synchronizing their respective power supplies.

40. The method of claim 39, further including reciprocating said conveyor in said opposite lengthwise directions without substantial movement of said conveyor normal to said lengthwise directions.

41. The method of claim 39 wherein step (b) further includes driving said motors in accordance with a predetermined motion pattern having a predetermined relationship to the motion of said conveyor.

42. The method of claim 41, further including storing said motion pattern in a memory.

43. The method of claim 41, further including driving said motors in step (b) selectively in accordance with a substantial directional reversal of said motion pattern.

44. The method of claim 39, further comprising sensing a motion having a predetermined relationship to the motion of said conveyor and driving said motors in step (b) in response to said sensing.

45. The method of claim 39 wherein said motors are electromagnetic motors.

46. A method of reciprocating at least two separate elongate conveyors in lengthwise directions comprising:
(a) providing at least two separate motors, each connected to a different one of said conveyors; and
(b) driving said motors with cyclical nonuniform motions by supplying power nonuniformly thereto, and synchronizing the respective nonuniform motions of said motors by synchronizing their respective power supplies.

47. The method of claim 46, further including reciprocating said conveyors in unison in lengthwise directions without substantial movement of said conveyors normal to said lengthwise directions.

48. The method of claim 46 wherein step (b) further includes driving said motors in accordance with a predetermined motion pattern having a predetermined relationship to the motions of said conveyors.

49. The method of claim 48, further including storing said motion pattern in a memory.

50. The method of claim 48, further including driving said motors in step (b) selectively in accordance with a substantial directional reversal of said motion patterns.

51. The method of claim 46, further comprising sensing motions having a predetermined relationship to the motions of said conveyors and driving said motors in response to said sensing.

52. The method of claim 46 wherein said motors are electromagnetic motors.

53. A method of moving products along an elongate conveyor by reciprocating said conveyor in opposite lengthwise directions comprising:
(a) providing a set of predetermined different motion patterns having a predetermined relationship to the motion of said conveyor;
(b) driving a motor selectively with a predetermined cyclical nonuniform motion by supplying power nonuniformly thereto in accordance with a selected one of said motion patterns, thereby reciprocating said conveyor; and
(c) providing said motion patterns in step (a) so as to reciprocate said conveyor at different frequencies while producing substantially the same average velocity of said products along said conveyor regardless of said different frequencies.

54. The method of claim 53, including providing said motion patterns in step (a) so as to produce different amplitudes of reciprocation of said conveyor.

55. The method of claim 53, including reciprocating said conveyor in said opposite lengthwise directions without substantial movement of said conveyor normal to said lengthwise directions.

56. The method of claim 53, further including storing said motion patterns in a memory.

57. The method of claim 53 wherein at least one of said motion patterns comprises a substantial directional reversal of another of said motion patterns.

58. The method of claim 53, further comprising sensing a motion having a predetermined relationship to the motion of said conveyor and driving said motor in step (b) in response to said sensing.

59. The method of claim 53 wherein said motor is an electromagnetic motor.

* * * * *